United States Patent [19]

Crandall

[11] Patent Number: 5,303,753

[45] Date of Patent: Apr. 19, 1994

[54] BUSH CUTTING APPARATUS

[76] Inventor: James A. Crandall, R.R. 1, Box 7A 3141 E. 1760 North, Sherrard, Ill. 61281

[21] Appl. No.: 75,606

[22] Filed: Jun. 14, 1993

[51] Int. Cl.⁵ .............................................. A01G 23/08
[52] U.S. Cl. ................................ 144/34 R; 56/121.43; 144/3 D; 144/336; 241/101.7
[58] Field of Search ...................... 30/369, 379, 379.5; 144/3 D, 34 R, 335, 336; 83/928; 56/121.43; 241/101.7

[56] References Cited

U.S. PATENT DOCUMENTS

| | | | |
|---|---|---|---|
| 3,929,294 | 12/1975 | Cox | 241/101.7 |
| 4,232,719 | 11/1980 | Paxton | 241/101.7 |
| 4,338,985 | 7/1982 | Smith et al. | 241/101.7 |
| 4,467,849 | 8/1984 | Denis | 83/928 |
| 4,592,398 | 6/1986 | Golob et al. | 144/34 R |

Primary Examiner—W. Donald Bray
Attorney, Agent, or Firm—Leon Gilden

[57] ABSTRACT

A housing is arranged to include a plurality of rows of projecting cutting wheels for projection into a bush to be cut, with the housing further including cutter knives mounted between adjacent coplanar pairs of the cutting wheels to effect the comminuting of brush and the like directed within the housing.

9 Claims, 4 Drawing Sheets

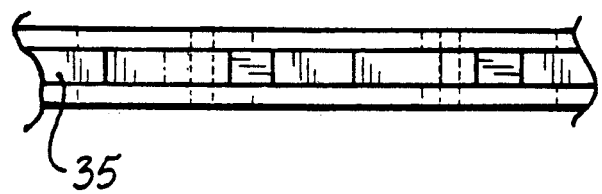
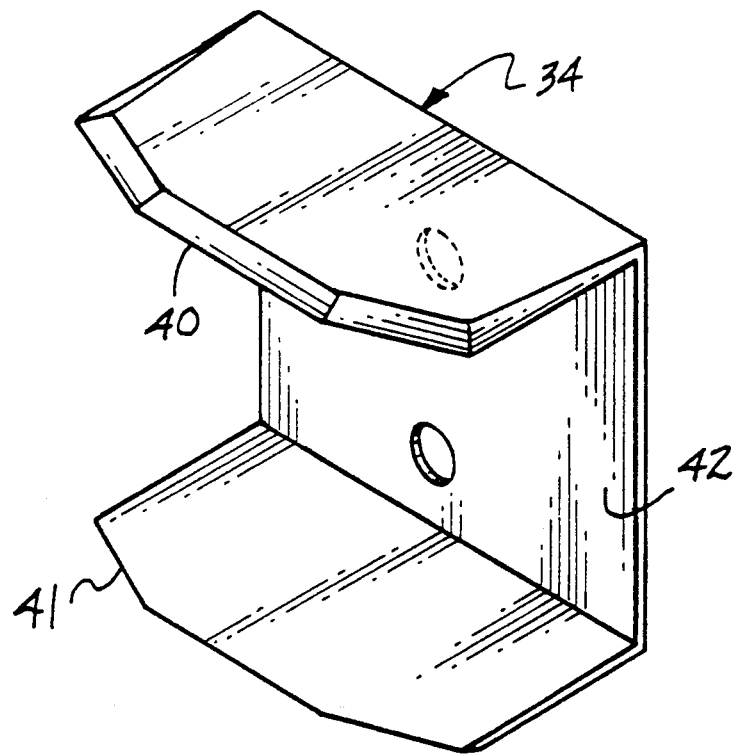

BUSH CUTTING APPARATUS

BACKGROUND OF THE INVENTION

1. Field of the Invention

The field of invention relates to bush cutting apparatus, and more particularly pertains to a new and improved bush cutting apparatus wherein the same is arranged for the mulching of bushes and the like for their trimming.

2. Description of the Prior Art

Brush cutting structure of various types are utilized throughout the prior art and wherein cutting blades for such cutting is indicated in the U.S. Pat. No. 4,938,012. U.S. Pat. No. 5,062,257 and U.S. Pat. No. 4,996,830 are examples of prior art mulling and brush cutting structure respectively.

The instant invention attempts to overcome deficiencies of the prior art by providing for a compact portable housing arranged for ease of mobility and for orientation relative to bushes for a trimming and cropping procedure and in this respect, the present invention substantially fulfills this need.

SUMMARY OF THE INVENTION

In view of the foregoing disadvantages inherent in the known types of trimming apparatus now present in the prior art, the present invention provides a bush cutting apparatus wherein the same is directed to the projection of cutting blades into a brush for trimming and comminuting thereof. As such, the general purpose of the present invention, which will be described subsequently in greater detail, is to provide a new and improved bush cutting apparatus which has all the advantages of the prior art bush cutting apparatus and none of the disadvantages.

To attain this, the present invention provides a housing arranged to include a plurality of rows of projecting cutting wheels for projection into a bush to be cut, with the housing further including cutter knives mounted between adjacent coplanar pairs of the cutting wheels to effect the communiting of brush and the like directed within the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bush cutting apparatus which has all the advantages of the prior art bush cutting apparatus and none of the disadvantages.

It is another object of the present invention to provide a new and improved bush cutting apparatus which may be easily and efficiently manufactured and marketed.

It is a further object of the present invention to provide a new and improved bush cutting apparatus which is of a durable and reliable construction.

An even further object of the present invention is to provide a new and improved bush cutting apparatus which is susceptible of a low cost of manufacture with regard to both materials and labor, and which accordingly is then susceptible of low prices of sale to the consuming public, thereby making such bush cutting apparatus economically available to the buying public.

Still yet another object of the present invention is to provide a new and improved bush cutting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view, taken along the lines 5—5 of FIG. 4 in the direction indicated by the arrows.

FIG. 6 is an isometric illustration of the knife members as oriented between the rotary cutters as positioned in FIG. 1.

DESCRIPTION OF THE PREFERRED EMBODIMENT

Figure 1:
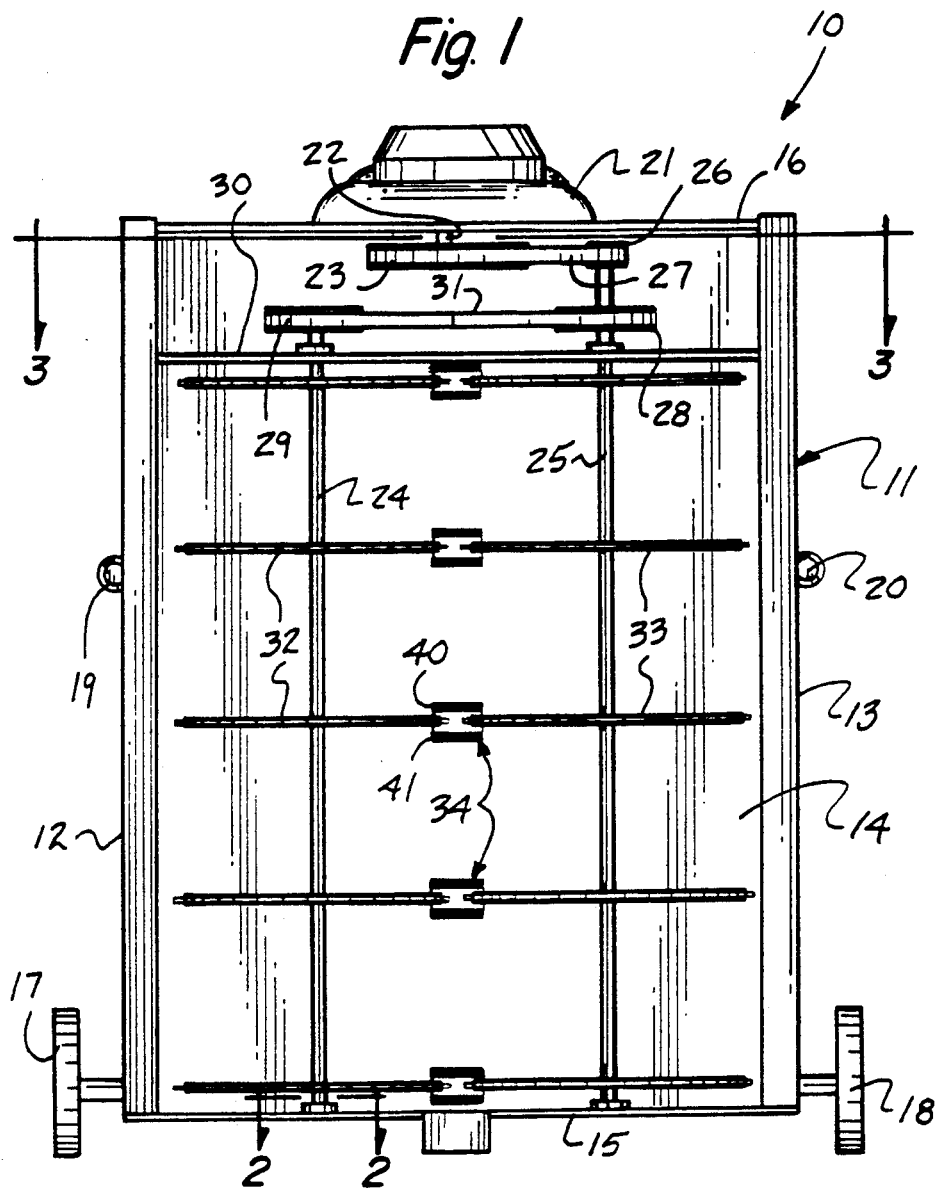
FIG. 1 is an orthographic view of the invention.

With reference now to the drawings, and in particular to FIGS. 1 to 8 thereof, a new and improved bush cutting apparatus embodying the principles and concepts of the present invention and generally designated by the reference numeral 10 will be described.

Figure 2:
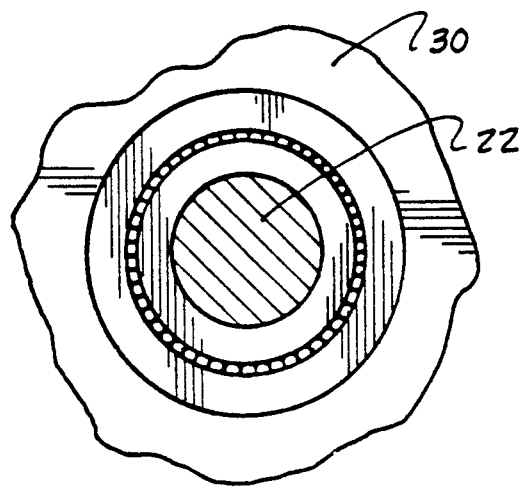
FIG. 2 is an orthographic view, taken along the lines 2—2 of FIG. 1 in the direction indicated by the arrows.

More specifically, the bush cutting apparatus 10 of the instant invention essentially comprises a housing 11, including a first side wall 12 spaced from a second side wall 13 in a parallel coextensive relationship, such that a semi-cylindrical rear wall 14 intersects the first and second side walls 12 and 13. A bottom wall 15 mounted to the housing 11 is spaced from a top wall 16. Respective first and second wheels 17 and 18 are rotatably mounted to the respective first and second side walls 12 and 13 in adjacency to the bottom wall 15, with a first handle 19 mounted to the first side wall and a second handle 20 mounted to the second side wall to provide for ease of mobility of the housing structure orienting the housing structure relative to a bush member to be cut. A drive motor 21 is mounted to the top wall 16, having an output shaft 22 directed into the housing through the top wall 16. A first pulley 23 is mounted to the output shaft 22. First and second shafts 24 and 25 are provided arranged in a parallel relationship relative to one another and within the housing between the first and second side walls 12 and 13 in a parallel relationship such that the use of an intermediate web 30 oriented between the top and bottom walls rotatably mount the shaft structure in a parallel relationship in a bearing type support, as indicated in FIG. 2 for example. A second pulley 26 is mounted to the second shaft between the intermediate wall 30 and the top wall 16, with a third pulley mounted intermediate the second pulley and the intermediate web 30. A fourth pulley 29 is mounted to the first shaft in a generally aligned relationship relative to the third pulley 28. A first drive belt 27 is mounted operatively between the first pulley 23 and the second pulley 26, with a second drive belt 31 mounted in operative relationship between the third and fourth pulleys 28 and 29 respectively to effect simultaneous rotation in a contra-rotating manner of the first and second shafts 24 and 25.

Figure 3:
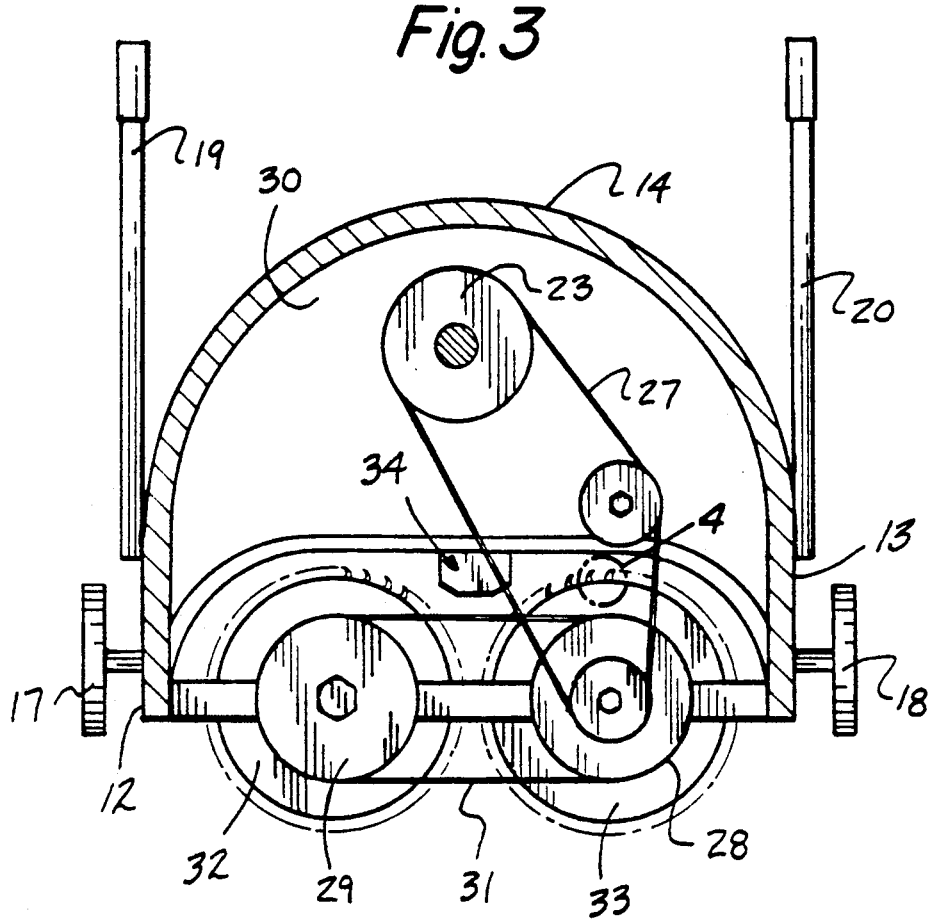
FIG. 3 is an orthographic view, taken along the lines 3—3 of FIG. 1 in the direction indicated by the arrows.
Figure 4:
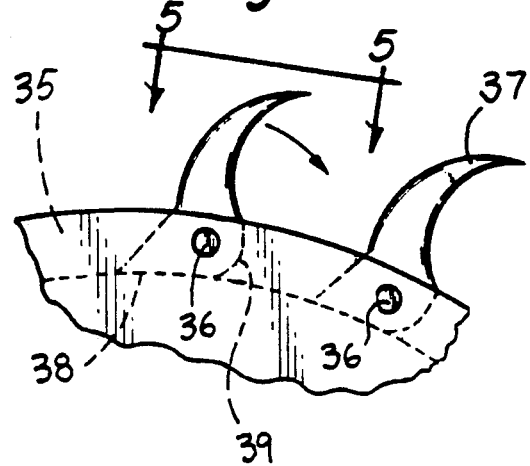
FIG. 4 is an enlarged orthographic view of section 4 as set forth in FIG. 3.
Figure 7:
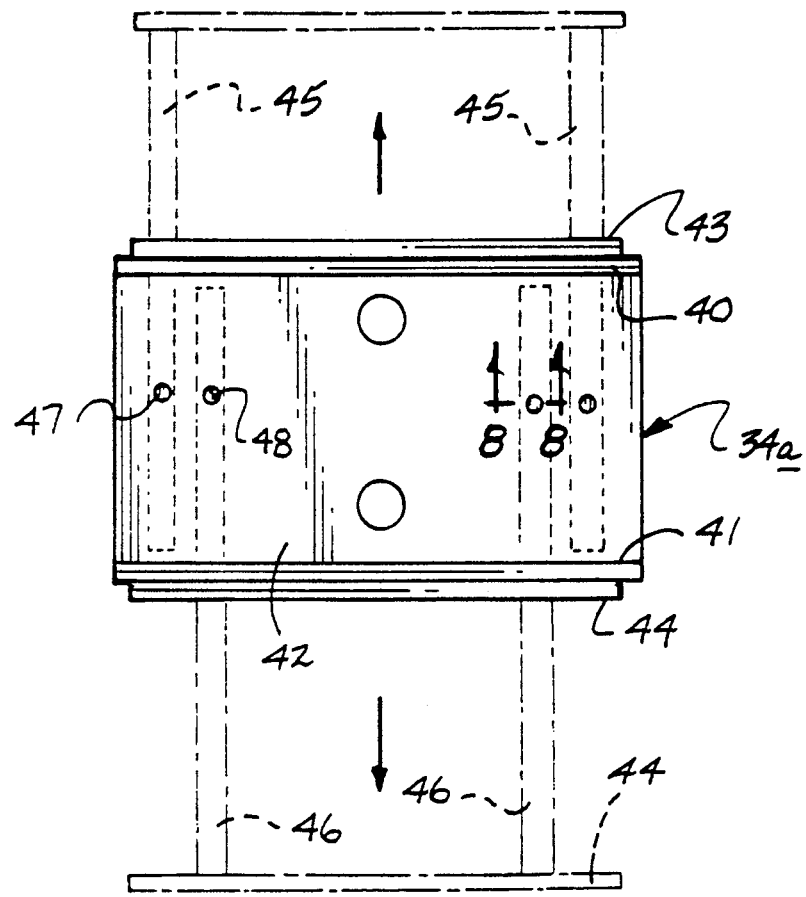
FIG. 7 is an orthographic view of a modified knife member structure.
Figure 8:
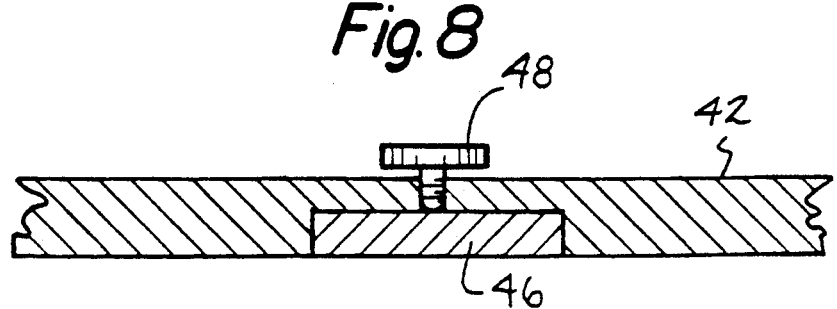
FIG. 8 is an orthographic view, taken along the lines 8—8 of FIG. 7 in the direction indicated by the arrows.

The first and second shafts 24 and 25 include a parallel array of respective first and second rotary cutter wheels 32 and 33 respectively, wherein one of the first rotary cutter wheels 32 is arranged in a coplanar alignment with a second rotary cutter wheel 33 to define a pair of such cutter wheels, with intermediate each of the pairs of cutter wheels a U-shaped cutter 34. The U-shaped cutter 34 (see FIG. 6) includes respective first and second arcuate blades 40 and 41 that in turn are arranged parallel relative to one another interconnected by a connecting web 42, that in turn is secured to the rear wall 14 within the housing 11. The first and second rotary cutter wheels 32 and 33 are arranged to project beyond the first and second side walls 12 and 13, in a manner as indicated in FIG. 3, to direct shrubbery within the housing 11 for the comminuting of such shrubbery. Further, the first and second rotary cutter wheels 32 and 33 each include an annular peripheral groove 35, having spaced cutter teeth axles 36 that are oriented parallel to the first and second shafts, such that the cutter teeth axles 36 each include a cutter tooth 37, with each tooth including a tooth bottom wall 38 received within the groove 35. The tooth bottom wall 38 includes an arcuate leading floor edge 39 concentric with the respective axle 36 to permit the pivoting about the arcuate leading forward edge 39 such that the teeth are provided freedom of movement but due to centrifugal force project beyond the associated cutter wheels permitting their interfolding relative to an associated and respective cutter wheel for the removal of debris and brush relative to the cutter wheels subsequent to a cutting procedure.

It should be noted that the first and second arcuate blades 40 and 41 are arranged to extend respectively above and below an associated alignment of each pair of cutter wheels to enhance the comminuting of shrubbery directed within the housing. Further to this end, the FIGS. 7 and 8 indicates the use of a modified U-shaped cutter 34a, having respective first and second auxiliary blades 43 and 44 positioned in adjacency to and parallel the respective first and second arcuate blades 40 and 41, with the first and second auxiliary blades 43 and 44 having respective first and second slides 45 and 46 orthogonally mounted to the respective first and second auxiliary blades 43 and 44 slidably received within the connecting web 42. The connecting web 42 includes dove tail grooves to receive the slides of a dove tail complementary configuration permitting securement of the slides by an individual respective first and second lock rod 47 and 48 arranged for abutment with an individual respective first and second slide 45 and 46, such as illustrated in the FIGS. 7 and 8, to provide for adjustment and projection of respective auxiliary blades relative to the blade structures 41 and 40.

In use of the organization, the housing 11 is oriented in a vertical manner, as indicated in FIG. 1, and positioned such as indicated in FIG. 3 (top view) when wheeled into position relative to an environment requiring brush cutting. To this end, it is noted the plurality of rows of projecting cutting wheels 32 driven operatively through the drive motor 21 through the output shaft 22 and through the associated interconnecting belt structure effects simultaneous rotation of the cutting wheels 32 that project beyond the housing 11, as indicated in FIG. 3, that in turn receives the brush directed therein to effect the comminuting action of the brush. Cutters 34, such as indicated in FIG. 3, enhance such comminuting action when the brush is directed thereon within the housing structure 11 against the rear wall of the housing structure, such as indicated in FIG. 3.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bush cutting apparatus, comprising, a housing, the housing including a first side wall spaced from, parallel to, and coextensive with a second side, and the housing having a semi-cylindrical rear wall extending from the first side wall to the second side wall interconnecting the first side wall and the second side wall, the housing further including a bottom wall and a top wall, and a first shaft and a second shaft mounted within the housing in a parallel coextensive relationship relative to one another and to the respective first side wall and the second side wall, with the first shaft including a plurality of first rotary cutters, and the second shaft having a plurality of second rotary cutters, with each of the first rotary cutters arranged in a coplanar relationship with one of the second rotary cutters to define a cutter pair, and drive means to effect simultaneous rotation of the first shaft, the second shaft, the first rotary cutters, and the second rotary cutters.

2. An apparatus as set forth in claim 1 including an intermediate web oriented parallel to and between the bottom wall and the top wall, with the first shaft and the second shaft rotatably mounted between the intermediate web and the bottom wall.

3. An apparatus as set forth in claim 2 wherein the drive means includes a drive motor mounted to the top wall, the drive motor having an output shaft directed into the housing between the top wall and the intermediate wall, the output shaft including a first pulley, the second shaft having a second pulley aligned with the first pulley, the second shaft including a third pulley, the first shaft having a fourth pulley, with the third pulley and the fourth pulley aligned relative to one another, with a first drive belt extending between the first pulley and the second pulley, and a second drive belt extending between the third pulley and the fourth pulley.

4. An apparatus as set forth in claim 3 wherein each of the rotary cutters includes an annular peripheral groove, each annular peripheral groove including a plurality of cutter teeth pivotally mounted within the groove, each of the cutter teeth having a tooth axle, with each tooth axle oriented parallel to the first shaft and the second shaft, and each tooth including a bottom wall, and the bottom wall positioned within a respective groove, and each bottom wall including an arcuate leading floor edge concentric with a respective axle.

5. An apparatus as set forth in claim 4 wherein the first rotary cutter and the second rotary cutter project beyond the housing.

6. An apparatus as set forth in claim 5 wherein the first side wall includes a first wheel, the second side wall includes a second wheel, the first wheel and the second wheel arranged for rotation relative to the first side wall and the second wall and positioned in adjacency to the bottom wall projecting beyond the bottom wall, with the first side wall having a first handle and the second side wall having a second handle for ease of manual manipulation of the housing.

7. An apparatus as set forth in claim 6 with each cutter pair having a U-shaped cutter oriented therebetween, with each U-shaped cutter having a first arcuate blade and a second arcuate blade, with the first arcuate blade positioned above said respective cutter pair, and the second arcuate blade positioned below said respective cutter pair.

8. An apparatus as set forth in claim 7 wherein the U-shaped cutter further includes a connecting web, the connecting web mounted to the rear wall.

9. An apparatus as set forth in claim 8 wherein at least one said U-shaped cutter includes a first auxiliary blade positioned in adjacency to the first arcuate blade, and a second auxiliary blade in adjacency to the second arcuate blade, with the first auxiliary blade and the second auxiliary blade arranged parallel relative to one another and the first auxiliary blade and the second auxiliary blade, with the first auxiliary blade including at least one slide received within the connecting web, and the second auxiliary blade including a second slide received within the connecting web, and a first lock rod mounted within the connecting web for abutment with the first slide, and a second lock rod directed through the connecting web for abutment with the second slide.

* * * * *